2,978,838
METHOD FOR CHANGING THE BEARING YEARS OF FRUIT TREES

Robert H. Beatty, Philadelphia, Pa., assignor to Amchem Products, Inc., Ambler, Pa., a corporation of Delaware
No Drawing. Filed Sept. 15, 1958, Ser. No. 760,856
3 Claims. (Cl. 47—58)

This invention relates to a method and composition for chemically modifying the vegetative balance of plants; and it more particularly relates to a method of chemically altering plant growth in such a manner as to cause buds which would normally differentiate as vegetative buds to differentiate as fruit buds, thus changing the bearing years of the trees.

It is well-known that various varieties of fruit trees tend to have an excessive crop of fruit in alternate years while, in the years between, the fruit crop is very poor or may even be non-existent. While practically all fruit varieties are subject to this phenomena, it is a particularly serious problem in regard to certain varieties of apples such as Baldwin, Cortland, Golden Delicious, Wealthy, Rhode Island Greening, Early MacIntosh and Macoun. These types of apples are grown on trees which are generally referred to as biennials or, in other words, those which bear fruit only on alternate years. In the years between the fruit bearing years or "off" years, the foliage growth is much more luxuriant than is the foliage growth during the fruit bearing or "on" years.

In recognition of the above phenomena and in an attempt to overcome the problems inherent therein, efforts have been made in the past to thin apple and stone fruit trees such as peach trees, plum trees, etc. by either chemical or hand thinning methods. However, although some fair results were obtained in a few varieties, in general, such efforts have not proven satisfactory in forcing normally biennial fruit trees to bear annually.

It is one object of the present invention to overcome the above and similar difficulties by providing a method which will effectively convert normally biennial bearing varieties of fruit trees to annual bearing types.

Another object of the present invention is to provide a method of the above type which will not injure either the trees themselves or the foliage thereof.

Another object of the present invention is to provide a composition which, when applied to fruit trees in proper proportions and in the proper seasons, will convert normally biennial bearing trees to annual bearing types.

Other objects and many of the attendant advantages of this invention will be readily appreciated as the same becomes better understood by reference to the following detailed description and claims.

This invention is based upon the discovery that if certain chemicals are applied to fruit trees at a certain time of the year in relation to the growth of the tree, this growth is so altered that fruit buds are formed where one would normally expect to find vegetative buds. The possibility that such changes in the plants' morphology could be chemically induced has not heretofore been known.

The specific materials which has been discovered to be capable of accomplishing this novel and unexpected result are, 2,3,5-trichlorobenzoic acid, 2,3,6-trichlorobenzoic acid, 2,3,5,6-tetrachlorobenzoic acid and 2,3,5-triiodobenzoic acid as well as their functional derivatives, such as the salts, amines, esters and amides.

Describing the process of the present invention with specific regard to apples, it has been found that application of the compounds to apple trees must be made during their so-called "on" or productive years, and that the materials should be applied over a 5 to 7 week period, commencing with the full bloom and continuing to the terminal growth state. Application of the materials at any time during this stage has been found to be effective. This particular stage is known to pomologists as the "terminal bud formation period."

The water soluble derivatives of these acids, and in particular the amine salts, are preferably applied by spraying in aqueous solutions. The acids and other substantially water insoluble functional derivatives may be applied to fruit trees according to well established agricultural practices. For example, the acids and their amides may be dissolved in suitable organic solvents such as ethyl alcohol or acetone, or they may be formulated as emulsions in the ordinary manner.

The compounds used in the process of the present invention may be applied to fruit trees over a wide range of concentrations. In general, it is preferred to use a concentration between 10 and 300 p.p.m. (parts per million of compound relative to the carrier therefor). At concentrations of less than 10 p.p.m. little benefit is secured from the process of the present invention. At concentrations of more than 300 p.p.m. some vegetative injury, such as leaf curling or other temporary injury may occur. At concentrations between 10 and 300 p.p.m., however, generally excellent results may be obtained with either no injury at all or, at most, only minimal injury to the foliage. The amides especially are usually safe at exceptionally high concentrations and result in little or no foliage or other tree injury.

The following examples are illustrative of the effects of various concentrations of some of the compounds embodying the present invention when applied to apple trees. The bud, bloom and flower cluster counts noted in the various examples all refer to those elements which would eventually mature to form the corresponding fruits.

Example I

Apple tree limbs of the Macoun variety were sprayed with a solution containing 50 p.p.m. of the indicated active ingredient. Spraying was effected two weeks following the full bloom stage. The percent bud count data was recorded during the following "off" season, 50 weeks after treatment.

| Active Ingredient | Rate, p.p.m. | Percent Bud Count on 4 Limbs With Flowers |
|---|---|---|
| Check | | 20.0 |
| 2,3,5-trichlorobenzoic acid | 50 | 40.8 |
| 2,3,6-trichlorobenzoic acid | 50 | 43.3 |

Example II

Here the results were obtained from whole tree treatments of Rhode Island Greening varieties of apple trees. The sprays were applied two weeks following the full bloom stage. The following bloom counts were obtained during the "off" season, 50 weeks following spray application.

| Active Ingredients | Rate, p.p.m. | No. Trees/ Treatment | Bloom Counts |
|---|---|---|---|
| Check | | 8 | 53 |
| 2,3,5,6-tetrachlorobenzoic acid | 25 | 4 | 70 |
| Do | 50 | 8 | 67 |
| Do | 100 | 8 | 83 |
| 2,3,5-triiodobenzoic acid | 25 | 4 | 67 |
| Do | 50 | 8 | 87 |
| Do | 100 | 8 | 81 |

Example III

Similar experiments were conducted on Baldwin type apple trees using the indicated active ingredient. Application was made two weeks following the full bloom stage and observations including bloom counts as recorded during the "off" season 50 weeks following treatment are listed as follows:

| Active Ingredients | Rate, p.p.m. | No. Trees/ Treatment | Bloom Counts |
|---|---|---|---|
| Check | | 3 | 0 |
| 2,3,5,6-tetrachlorobenzoic acid | 75 | 6 | 28 |
| Do | 150 | 3 | 36 |
| 2,3,5-triiodobenzoic acid | 75 | 6 | 40 |
| Do | 150 | 3 | 59 |

Example IV

The following table lists data obtained from limb treatments of Early MacIntosh variety of apple trees. The compounds were applied two weeks following the full bloom period. Results were obtained from single limb treatments and were recorded during the "off" season 50 weeks after spraying.

| Active Ingredient | Rate, p.p.m. | Flower Cluster Count at Spraying | Flower Cluster Count after 50 Weeks |
|---|---|---|---|
| Check | | 140 | 6 |
| 2,3,5-trichlorobenzoic acid | 50 | 182 | 79 |
| Do | 250 | 150 | 62 |
| 2,3,5,6-tetrachlorobenzoic acid | 50 | 164 | 50 |
| Do | 250 | 128 | 18 |

Example V

The same compounds used in Example IV were also applied to single limbs of the Wealthy variety of apple trees with the following data being recorded during the "off" season 50 weeks after spray treatment.

| Active Ingredient | Rate, p.p.m. | Flower Cluster Count at Spraying | Flower Cluster Count after 50 Weeks |
|---|---|---|---|
| Check | | 169 | 28 |
| 2,3,5-trichlorobenzoic acid | 50 | 192 | 53 |
| Do | 250 | 167 | 145 |
| 2,3,5,6-tetrachlorobenzoic acid | 50 | 129 | 103 |
| Do | 250 | 178 | 33 |

From the foregoing information it will be appreciated that the compounds of this invention are capable of producing a highly novel and a heretofore entirely unexpected plant response; to wit, the ability to convert normal biennial bearing varieties of fruit trees to annual bearing types with no noticeable injury to either the foliage or trees.

I claim:
1. A method of converting biennial fruit bearing trees to annual fruit bearing trees which comprises applying a polyhalogenated benzoic acid compound in a non-phytotoxic concentration to the trees during their fruit bearing years and during the period of their fruit-producing stage between full bloom and terminal growth.

2. The method of claim 1 wherein the polyhalogenated acid compound is admixed with a carrier of a concentration of between about 10 and 300 parts of compound to about 1 million parts of carrier and the mixture is sprayed on the trees.

3. A method of converting biennial fruit bearing trees to annual fruit bearing trees which comprises applying a polyhalogenated benzoic acid compound to the trees in a non-phytotoxic concentration during their fruit bearing years and during the period of their fruit-producing stage between full bloom and terminal growth, said compound being a member of the group consisting of 2,3,5-trichlorobenzoic acid, 2,3,6-trichlorobenzoic acid, 2,3,5,6-tetrachlorobenzoic acid, 2,3,5-triiodobenzoic acid, and the salts, esters, amines and amides of said acids.

References Cited in the file of this patent
UNITED STATES PATENTS 2,394,916 Jones _____ Feb. 12, 1946

OTHER REFERENCES

Publications:
Zimmerman (1943), "Present Status of Plant Hormones," published May 1943 in Industrial and Engineering Chemistry (magazine), vol. 35, No. 5, pages 596 through 601.

"Hormones and Horticulture" (Avery et al.), published by McGraw-Hill (N.Y.) 1947. Pages 122 through 139 are relied on.

Zimmerman et al.: "Growth-Regulating Effects of Chlorosubstituted Derivatives of Benzoic Acid," published March 1951 in Contributions From Boyce Thompson Institute, vol. 16, No. 5, pages 209 through 213.

Zimmerman et al.: "Substituted Benzoic Acids as Growth Regulators," published March 1952 in Contributions From Boyce Thompson Institute, vol. 16, No. 9, pages 419 through 427.

Chemical Abstracts, vol. 48, published 1954, columns 10283 and 10284. Three articles: Hormones for Thinning . . .; Growth Substances as Fruit Thinning . . .; Trials With Growth Substances as Fruit-Thinning Agents.

Chemical Abstracts, vol. 50, published 1956, column 522, article "The Use of Chemical Thinning Sprays."

Chemical Abstracts, vol. 50, published 1956, column 10967, article "1-Naphthaleneacetamide: A Chemical Fruit Thinner."